United States Patent
Haque et al.

(12)

(10) Patent No.: US 6,497,078 B1
(45) Date of Patent: Dec. 24, 2002

(54) ADHESIVE COMPOSITION FOR CHEMICALLY INERT SUBSTRATE

(75) Inventors: Shah A. Haque, Houston, TX (US); Richard Chmiel, Houston, TX (US); David Birt, Jr., Houston, TX (US); Richard L. Iazzetti, Houston, TX (US); Thomas G. Priest, Houston, TX (US)

(73) Assignee: Forty Ten L.L.C., Houston, TX (US)

( * ) Notice: Subject to any disclaimer, the term of this patent is extended or adjusted under 35 U.S.C. 154(b) by 0 days.

(21) Appl. No.: 09/459,433

(22) Filed: Dec. 13, 1999

(51) Int. Cl.[7] .................................................. E04B 1/38
(52) U.S. Cl. ........................ 52/417; 52/287.1; 403/179; 403/265
(58) Field of Search ................................ 52/287.1, 416, 52/417, 741.4; 403/179, 265

(56) References Cited

U.S. PATENT DOCUMENTS

| | | | | |
|---|---|---|---|---|
| 4,695,508 A | * | 9/1987 | Kageyama et al. | 156/330 |
| 5,218,031 A | * | 6/1993 | Nayder et al. | 524/376 |
| 5,881,521 A | * | 3/1999 | Porter et al. | 52/417 |
| 6,226,946 B1 | * | 5/2001 | Stough et al. | 52/417 |
| 6,287,411 B1 | * | 9/2001 | Kelley et al. | 156/333 |

* cited by examiner

Primary Examiner—Michael Safavi
(74) Attorney, Agent, or Firm—John R Casperson

(57) ABSTRACT

A unique adhesive composition consisting of two parts, a resin and a curing agent, is disclosed. The composition has good adhesion to chemically inert substrates, both flexible and rigid. It is useful for sealing discontinuity in concrete slabs, tanks, decks, pipe lining or combinations thereof.

3 Claims, 1 Drawing Sheet

A = 90 mil to 50 ± 15 mil taper – each leg
B = 90 ± 15 mil
C = 3 ½ inch
D = 2 ½ inch

ADHESIVE COMPOSITION FOR CHEMICALLY INERT SUBSTRATE

FIELD OF INVENTION

In one aspect, this invention relates to controlling the rate of a cross-linking reaction that occurs during the curing of a chemical composition. In another aspect, this invention relates to an adhesive composition. In a further aspect, the invention relates to an adhesive composition that bonds to a chemically inert substance. In yet another aspect, this invention relates to bonding a chemically inert elastomeric tape to a substrate.

BACKGROUND OF THE INVENTION

A wide variety of coatings for sumps, tank interiors, containment linings, flooring systems and joint overlays are known. However, such coatings tend to fail upon the failure or movement of the underlying substrate to which the coatings are bonded, generally by cracking, peeling or delaminating. The problem is worse where movement between adjacent substrates is likely, such as in a corner, or along an expansion joint or crack.

Coating integrity can be enhanced by adhering an elastomeric tape to the substrate along the just identified troubled areas. However, chemically inert elastomeric tapes, which are able to resist degradation by acids, bases and solvents, are very difficult to reliably bond to many substrates and require specialty adhesive. An adhesive which provides good bonding, has good flexibility and gap bridging properties between concrete, vinyl ester, epoxy and many other substrates would be very desirable.

An adhesive which retains these properties under conditions of low temperatures where many adhesive materials become brittle, or high temperatures where many adhesive materials loose strength, would also be very desirable.

Many adhesive systems are difficult to apply in the field. Extremes of field conditions, such as extremes of temperature or humidity, can make it further difficult to apply an adhesive so as to achieve a satisfactory bond. An adhesive which may be applied at a temperature as low as 5° C., and as high as 60° C., and over a wide range of humidity, without affecting its properties, would be very desirable. A chemically resistant adhesive is needed in various industrial applications. The majority of current adhesive systems are adversely affected by strong acids, bases and solvents and are also susceptible to degradation by ozone, UV-rays, and γ-rays. An adhesive system that is resistant to degradation by such agents, as well as to discoloration induced by these or other agents would also be very desirable.

SUMMARY OF THE INVENTION

In accordance with one embodiment of the invention there is provided a composition comprising a resin, and a curing agent. The composition can be used as an adhesive. In accordance with a preferred embodiment of the invention, the resin comprises a reactive polyolefin, at least one acrylate monomer, and an epoxy. The curing agent is a modified polyamine. An adhesive composition formed by mixing resin and curing agent is well adapted for adherence to a chemically inert elastomeric tape and substrates like concrete or coated concrete.

In an even more preferred embodiment, the reactive polyolefin component comprises a halogenated and chlorosulfonated polyethylene that is combined with sufficient acrylate monomer to achieve solubility. An alkyl phenol is added to prevent the resin from pre-gelling when in contact with the curing agent. The adhesive composition, obtained by mixing resin and curing agent, has good initial tack and cures over a time period ranging from a few minutes to a few hours. The cured composition has outstanding resistance to aggressive chemicals and outstanding adhesion to both concrete and to an elastomeric tape formed from related materials. Also, it has been found that incorporating a minor amount of trichloroethylene into the adhesive composition provides even further improved adhesion to the elastomeric tape.

DETAILED DESCRIPTION OF THE INVENTION

Figure 1:
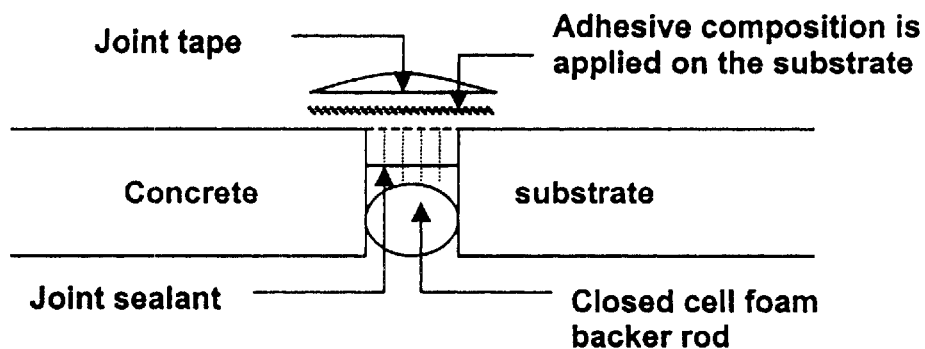
FIG. 1 shows an application of the unique adhesive composition in joint sealing. The joint of the concrete substrate is filled with closed cell foam backer rod covered with sealant. The unique adhesive composition is applied over it and then secured with joint tape.
Figure 2:
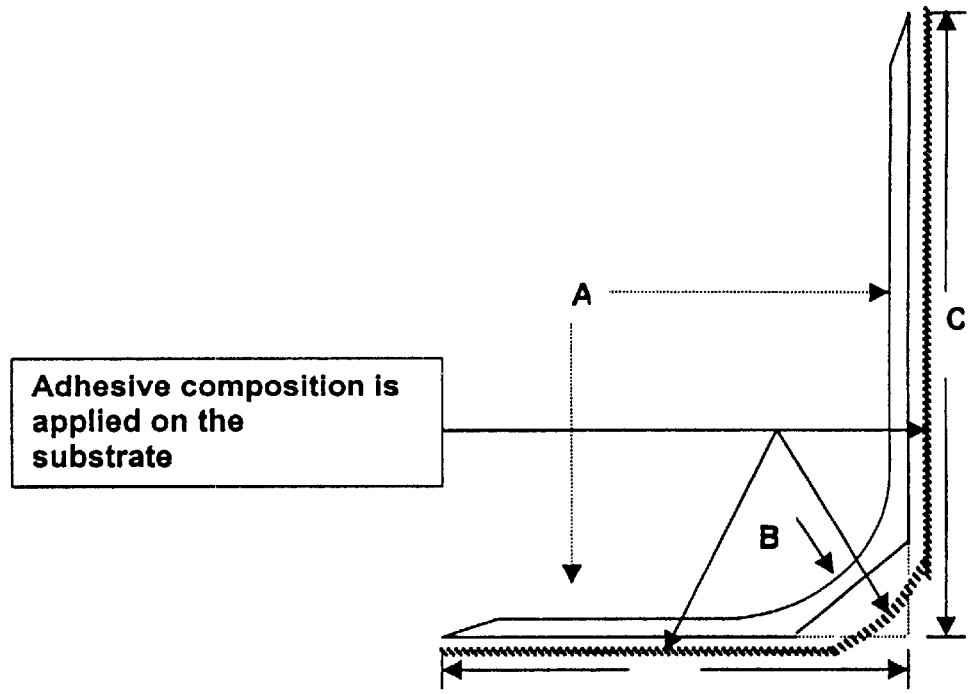
FIG. 2 is an application of an L-shaped joint cove with the dimension as mentioned in the figure. However the application of the adhesive composition should not be limited to these two only.

In accordance with one embodiment of the invention there is provided a composition comprising a resin, and a curing agent. The composition can be used as an adhesive, and is especially useful for bonding inert polyolefin structures, for example joining joint tape to a substrates which can be for example, concrete.

The Resin

Generally speaking, the major component of the resin comprises (a) reactive polyolefin, (b) at least one acrylate monomer, and (c) an epoxy. The resin contains an alkyl phenol. It also preferably includes a minor amount of trichloroethylene, which has been found to improve adhesion between inert polyolefin tape and concrete substrate.

(a) The Reactive Polyolefin Component

The reactive polyolefin component preferably comprises a reactive halo- and halosulfonated polyolefin. More preferably, the polyolefin is chlorinated and chlorosulfonated. In the preferred embodiment, the chlorine content generally ranges from between about 20 wt % to about 50 wt %, and the sulfur content generally ranges from about 0.5 wt % to about 2.5 wt %, based on total weight of the reactive polyolefin.

Generally speaking, the reactive polyolefin component can be represented by the formula:

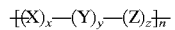

Wherein X represents an alkyl group, Y represents a halide group, Z represents a halosulfonyl group, $x+y+z=1$, $0.2 \leq y \leq 0.5$, $0.005 \leq z \leq 0.05$, and $50 \leq n \leq 10{,}000$.

Usually, the reactive polyolefin component can be represented by the formula

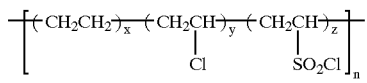

As determined by gel permeation chromatography, the molecular weight, $M_n$, generally ranges between about 1,000 and 250,000 and the molecular weight distribution, MWD, generally ranges from 1.5 to 6.5.

An exemplary material suitable for use in the invention is represented by the above formula where y=0.43, z=0.011 and n≅1500.

(b) Acrylate Monomer

Generally speaking, acrylate component comprises an acrylate or methacrylate or both. Acrylate monomer is preferably represented by the formula:

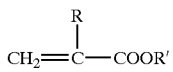

Where R=H or CH$_3$, and R' is C$_1$–C$_{15}$ alkyl or alkenyl group, preferably a C$_1$–C$_8$ alkyl or alkenyl group. Preferably, a sufficient amount of the acrylate monomer is present to solubilize the reactive polyolefin component. The most preferred acrylate monomer comprises methyl methacrylate, because of good solubility of the reactive polyolefin.

(c) The epoxy component

The epoxy resin component is generally characterized as a polyepoxide. The epoxy content generally ranges from between about 1.7 and about 2.0 epoxy functional group per chain. Usually, the epoxy resin comprises a diepoxide represented by the formula:

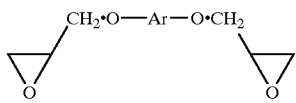

Wherein Ar comprises an aryl group containing between about 12 and about 24 carbon atoms. An exemplary material comprises Bis-F epoxy that is Bis(4-glycidyloxyphenyl) methane represented by the formula:

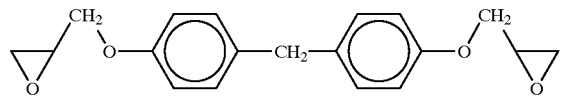

However, a Bis-A epoxy, as represented by the following formula, could be used within the scope of the present invention.

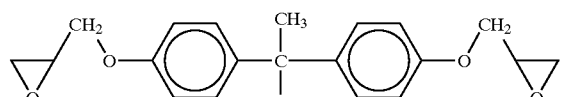

Role of Alkyl Phenol

Alkyl phenol plays major role in this adhesive composition. Usually in three component adhesive formulation an aminophenol like 2,4,6-tris(dimethylaminomethyl)phenol is mixed with the resin prior to addition of the curing agent. This aminophenol protects the SO$_2$Cl functional group of Hypalon from immediate gelling. However, being reactive to epoxy, it can not be added in the formulation, and must be kept as separate component to be added prior to use. This makes the composition inconvenient for field application. An absence of the phenolic component in the resin causes immediate pre-gelling on addition of the curing agent, and makes it useless for application as an adhesive.

In the present invention, an alkyl phenol is added in the resin during production. Thus it turns out to be a two-part adhesive composition, a resin and a curing agent, convenient for use in the field application. Alkyl phenol has two actions in the composition. It protects Hypalon from immature gelling, and enhances the reactivity of epoxy component. In another aspect, the invention thus provides a method for effecting a cure of a composition that contains a reactive halosulfonated polyolefin in a controlled manner. The method is carried out by combining therewith an amount of curing agent to initiate cross-linking reaction of the resin comprising of reactive halosulfonated polyolefin containing nonyl phenol to effect a cure of said composition to a flexible, semi-solid stage. Preferably, the cure reaction occurs over a period ranging from about 5 minutes to about 5 hours at a temperature in the range of from about 0° C. to about 50° C. The preferred alkyl phenol is nonyl phenol as represented by the formula:

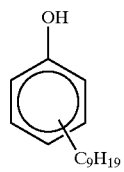

Amounts

The above described reactants for producing the are preferably combined in an admixture which is further preferably characterized by the essential absence of non-reactive solvent. The admixture generally contains in the range of from about 10 wt % to about 50 wt % of the reactive polyolefin, in the range of from about 10 wt % to about 50 wt % of the acrylate monomer, and in the range of from about 10 wt% to about 50 wt % of the epoxy resin, and in the range of from about 2 wt % to about 15 wt % of the alkyl phenol, and lesser amounts of optional other ingredients as shown in the example herein.

Curing Agent

Generally speaking, a sufficient amount of curing agent is added to the resin to become cured after a useful working life in the range of from about 3 to about 300 minutes, preferably after about a working life in the range of from about 10 to about 100 minutes. Preferably, the resin and the curing agent are brought together simply by adding while the mixture is stirred moderately.

The curing agent is a polyamine, preferably comprising at least two-amine functionality per molecule. More preferably, the reactivity of the amine is partially controlled via addition reaction with acrylate in order to moderate high reactivity of halosulfonated polyolefin. Exemplary curing agents can be represented by the formula:

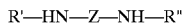

Wherein R' is independently selected from the groups consisting of H, a C$_1$–C$_4$ alkyl group, and R" and Z are selected from the group consisting of a C$_1$–C$_{15}$ alkyl group and a C$_6$–C$_{10}$ aryl group. An exemplary curing agent is available from Shell Chemical Company under the trade name "Epicure 3251". It contains a Mannich base of the general formula:

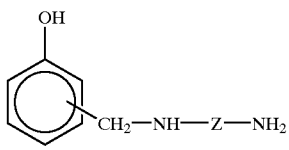

Where Z is a $C_1$–$C_{15}$ alkyl group. The reactivity of the amine is partially controlled by addition reaction with acrylate or methacrylate, preferably with 2-ethylhexyl acrylate. More preferably the acrylate is a nitrogen bearing such as N,N'-dimethylaminoethyl acrylate. Generally a preferred composition contains about 40 to 90% free Mannich base and about 10 to 60% addition product of the formulae:

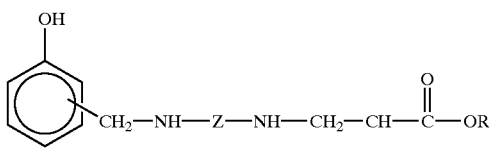

Wherein R is an alkyl, aryl group with or without containing one or more tertiary nitrogen.

The invention provides a method for effecting a cure of the resin that contains a reactive halosulfonated polyolefin in a controlled manner. The method is carried out by combining sufficient amount of a modified polyamine with the resin containing reactive halosulfonated polyolefin to initiate a controlled cross-linking reaction to effect a cure of said composition to a flexible solid material. The role of the alkyl phenol is to control pregelling of the otherwise highly reactive halosulfonated polyolefin. Thus resulting into a useful composition. Preferably, the cure reaction occurs over a reaction period ranging from about 5 minutes to about 5 hours at a temperature in the range of from about 0° C. to about 50° C. The crosslinking reaction is sufficiently slow so that the temperature of the curing composition does not increase over about 5° C. under field conditions.

Adhesive Composition

The adhesive composition is prepared by slow mixing of the curing agent to the resin while stirring moderately. Generally sufficient amount of curing agent is added to the resin to effect the cure to obtain a semi-flexible material. Usually 10 parts to 50 parts of the curing agent is added to 100 parts of the resin. More preferably, the amount of the curing agent is 20 parts to 30 parts.

The invention was developed with a view toward providing an improved interior joint structure for a building, container or the like. Usually two substrates come together to define the joint section, such as a corner or an expansion joint. The substrates are usually concrete, often concrete which has been polymer coated, such as vinyl ester, epoxy or the like. A chemically inert polyolefin tape covers the joint section. An adhesive composition according to the invention secures the chemically inert polyolefin tape to the substrates to provide a strong bond between the substrates and the chemically inert polyolefin tape.

The chemically inert polyolefin tape is preferably impermeable to water and is flexible and tear-resistant so as to resist water permeability in the event of relative movement between the two substrates that define the joint section. A highly suitable tape for use in accordance with the invention is formed from chlorosulfonated polyethylene that has been cross-linked and has a thickness in the range of from about 0.1 to about 10 millimeters. A preferred tape is one that has been cross-linked and has a thickness in the range of from about 0.3 to about 3 millimeters, with a mid-section of the tape having a greater thickness than edge sections of the tape. An exemplary tape formed from this material is resistant to strong organic and inorganic acids, e.g., glacial acetic acid, 98% $H_2SO_4$, 70% $HNO_3$, and 85% $H_3PO_4$.

In the method of the invention, an adhesive composition in accordance with the invention is applied on a surface of a substrate alongside a discontinuity. A flexible tape, such as that just described, is positioned on the adhesive composition and in sealing relationship with the discontinuity. The adhesive composition is then permitted to cure thereby adhering the substrate and the tape to seal the discontinuity. The coating is then permitted to cure thereby adhering the adhesive composition the substrate and to the tape to seal the discontinuity.

The invention is further illustrated by the following examples.

EXAMPLE I

The Resin

The ingredients used in an exemplary composition are tabulated below, wherein the components are a reactive polyolefin, an acrylate, an epoxy, an alkyl phenol and halogenated ethylene.

TABLE I (The Resin)

| Components | wt % | Functionality (moles/100 gm) | |
|---|---|---|---|
| Hypalon H-30 | 24.02 | 8.2 ($10^{-3}$) | —$SO_2Cl$ group |
| MMA | 25.22 | 0.252 | double bond |
| 2-EHA | 5.05 | 0.03 | double bond |
| MTBHQ | 0.05 | — | — |
| TCE | 6.00 | 0.046 | double bond |
| 1,6-HDODA | 2.04 | 0.02 | double bond |
| EPON 862 | 30.15 | 0.175 | epoxy group |
| Color | 1.68 | — | — |
| BYK 501 | 0.14 | — | — |
| Nonyl phenol | 5.65 | — | — |

In the table above, Hypalon H-30, also known as CSPE, is a reactive polyethylene containing 43 wt % chlorine and 1.1 wt % sulfur. It was obtained from Dupont. Different grades of CSPE are considered usable in this invention although in this example H-30 was used. MMA is methyl methacrylate (Elf-Atochem). 2-EHA is 2-ethylhexylacrylate (Elf-Atochem). MTBHQ is mono-t-butyl hydroquinone (Eastman Chemical Co.), a polymerization inhibitor. TCE is trichloroethylene (Industrial Chemical Co.). 1,6-HDODA is 1,6-hexanediol diacrylate (BASF). EPON 862 is Bis-F epoxy from Shell Chemical Co. Color is Bis-F epoxy based dark gray color obtained from Picco Coatings Co., Inc. BYK501 is a defoaming agent obtained from BYK-Chemie, USA.

The resin was prepared by the following procedure:

The resin was prepared in 18 liter scale. About two-third, 2.88 Kg., of Hypalon H-30 was taken in a metal can covered and fitted with a mechanical stirrer. Then 4.54 kg. MMA, 0.91 kg. 2-EHA, 1.08 kg. TCE and 9 gm. MTBHQ were added successively. The mixture was stirred for 8 hours to dissolve most of the Hypalon H-30. The temperature of the solution was controlled below 130° F. Then the remaining Hypalon H-30 (1.44 kg.) was added and the mixture was stirred moderately until all Hypalon H-30 dissolved completely (about 8 hours) within the specified temperature range. Then 0.367 kg of 1,6-HDODA was added and stirred for 15 minutes to obtain a smooth solution. Then 5.43 kg. of EPON 862 was added slowly over a period of 15 minutes while stirring at high speed. For quality control at this stage, 4 gm. of the product was dissolved in 4 ml of MEK (methyl ethyl ketone) to obtain a clear solution. To this solution, 4 gm. of acetone was added slowly while stirring slowly. The product showed slight turbidity. No precipitation occurred. Precipitation would have been an indicator of material failure. Finally, 0.302 kg. of color, 25 gm. BYK 501 and 1.02 kg. of nonyl phenol were added successively and the resulting admixture was stirred for another 30 minutes to ensure complete dispersion of the ingredients.

Curing Agent

The curing agent is a polyamine. In the preferred embodiment a partially modified Epicure 3251 (Shell Chemical Co.) was used. The partial modification was intended for controlling reactivity, improved adhesion and corrosion resistance. The composition of the preferred curing agent for this invention is shown below:

TABLE II (The Curing Agent)

| Components | wt % | Functionality (moles/100 gm) |
|---|---|---|
| Epicure 3251 | 86.95 | 1.144 amine [H] |
| DMAEA | 13.05 | 0.091 double bond |

Wherein DMAEA is N,N'-dimethylaminoethyl acrylate, a tertiary nitrogen containing acrylate.

The curing agent was prepared in 5 liter scale. To 4.35 kg. of Epicure 3251, the acrylate monomer (0.65 kg.) DMAEA was added slowly over a period of 15 minutes while stirring moderately. The reaction is exothermic. The temperature was controlled within 170±15° F., usually by slowing down the addition of acrylate. After completing the addition, stirring was continued until the temperature subsided to room temperature (90–120° F).

Preparation of Adhesive Composition

An adhesive composition was prepared by stirring 100 gm of the resin with 25 gm of curing agent and mixed thoroughly for 2 to 3 minutes. The resulting adhesive composition was then applied to the substrate.

TABLE III (Adhesive composition)

| Components | Parts (by wt) | Time of mixing |
|---|---|---|
| The resin | 100 | |
| Curing agent | 25 | 2–3 min |

The following properties were observed for the resin, the curing agent and the cured adhesive composition.

(1) Viscosity—Brookfield viscosity of the resulting resin was in the range of 8,000 to 9,000 cps (at 77° F., HB #4). The viscosity of the curing agent was 3,000 to 4,000 cps (at 77° F., HB #4).

(2) Density—The density of the resin was 9.36 lb/gallon, and that of the curing agent was 8.52 lb/gallon as measured at 77° F. (The resin and the curing agent had flash point (F.p.) at 65° F. and at 230° F., respectively.)

(3) Gel time—An adhesive composition as in Table III showed gel time of 45 minutes in 200 gm. Scale. The set time was observed to be about 4 hours. The test was carried at a laboratory temperature of 75° F. and 90% relative humidity.

(4) Hang on vertical wall—The composition as in Table III above had a hang on a vertical wall of 20 mil thick at 70° F. at 83% relative humidity. The hang test was conducted by adding 5 wt % of fumed silica (of the resin) to the adhesive composition.

(5) Lap shear test A—The composition as in Table III above was applied on steel coupons. Steel-to-steel lap shear was determined as per ASTM D1002-94. The material was cured for one week at 80° F. and then at 130° F. for 1 hour, respectively. The lap shear, measured at room temperature, was 835 psi (lb/sq.in.).

(6) Lap shear test B: The composition as in Table III above was applied on steel-elastomer tape-steel. The elastomer tape (polyethylene based chemically inert tape) was 1"×1" size, and thickness about 80 mil. The material was cured as above. The lap shear, measured at room temperature was 406 psi.

(7) Acid Resistance Tests—The adhesive composition as in Table III above was applied on two surfaces for acid resistance tests.

(a) Chlorinated polyester coated concrete for HNO3 immersion test—The adhesive composition was applied on the concrete surface to a thickness of approximately 20 mil, and then immediately 2"×2"elastomer tape was put over the adhesive. It was then cured at 80° F. for 16 hr and then at 140° F. for 8 hr.

The tape was immersed in 70% HNO3 for 3 days. Then the acid was drained out and the area was washed with water 4-5 times. No adhesive failure was observed. The tape remained strongly adhered to the coated concrete, even after 3 days of strong acid immersion. The adhesive was not eaten up underneath by strong acid. Qualitative peel test revealed tape tear off rather than adhesion failure.

(b) Epoxy coated concrete for $H_2SO_4$ immersion test— Epoxy coated concrete was necessary to protect it against 98% $H_2SO_4$. The adhesive composition was tested as in 7(a) using 98% $H_2SO_4$ instead of nitric acid. In this case also, the adhesive composition did not fail. The tape remained strongly adhered to concrete. The acid formed an ablative layer on the adhesive edge. The Peel test revealed tape tear off, but not adhesion failure.

(8) Physical Properties of the Adhesive Composition—The adhesive composition as in Table III was cast into a slab of 60 mil thickness, cured at 65° F. for 8 hours and then at 140° F. for 8 hours. The cured material was cut into dumbbell shapes and the physical properties were determined according to ASTM-412. The hardness (Shore-A) was measured using a Durometer. The results are as follows:

TABLE IV

| Tensile, psi | Elongation, % | 50% Modulus | Durometer |
|---|---|---|---|
| 746 | 99 | 415 | 75 |

Comparative Example

Resin without Nonyl Phenol

In this example, the resin was prepared according to Table I except that nonyl phenol was omitted. Adding curing agent to this resin in a ratio of 100/25 by weight (as in Table III) caused immediate pre-gelling.

Curing Agent without Acrylate

In this example, the curing agent was pure Epicure 3251 (without modification). Addition of the curing agent in the resin (Table-I) in a ratio of 100/25 by weight caused high increased in viscosity making it difficult to apply on the substrate.

When proportionately other amines like Epicure 3271, Epicure 3218 (all are from Shell Chemicals Co., not a Mannich base) are used, the adhesive composition pregelled within 5 minutes.

Curing Agent with Acrylates other than Nitrogen containing Acrylates

An adhesive composition was prepared as in Example I (Table III), except that the curing agent was of different modification. The curing agent was prepared by Epicure 3251 (83.33 wt %) and 2-EHA (2-ethylhexyl acrylate, Elf-Atochem) (16.67 wt %). In this particular modification, the acrylate does not contain tertiary nitrogen (compare to DMAEA in Table II). This adhesive composition was found to have Lap shear (steel-steel, Test-5A and steel-tape-steel, Test-5B) 192 lbs/inch and 108 lbs/inch, respectively.

EXAMPLE II

This is an example of the application of the novel adhesive composition in protection of joint structure. The joint structure consists of two substrates coated with the adhesive composition and secured by an inert elastomeric tape. Elastiliner Joint Tape (EL joint tape is a polyolefin based elastomeric tape which is highly resistant to 98% $H_2SO_4$, 70% $HNO_3$, glacial acetic acid, strong organic and inorganic bases, as well as some organic solvents. A typical tape has the following composition:

TABLE V (Tape composition)

| Components | wt % |
|---|---|
| Chlorosulfonated polyethylene | 65.6 |
| Carbon black | 1.7 |
| Titanium dioxide, white | 0.2 |
| Clay (amine modified) | 16.4 |
| Epoxy resin | 7.8 |
| Processing oil | 4.6 |
| Sulfur | 0.65 |
| Mixture of curing agents | 2.9 |

The tape materials were mill mixed, extruded to a 6" wide tape and cured at 325° F. for 30 minutes. The cured tape was flexible (300–500% elongation), high tensile (3000–4000 psi tensile strength), exhibiting good tear (200–300 lb/inch Die C tear) and was unaffected by strong acids and bases. Because of its strong chemical resistance, it did not adhere to any substrate using conventional adhesives. However, as shown above, adhesion was excellent when the inventive adhesive composition was used.

EXAMPLE III

The novel adhesive composition was applied to secure the chemically inert tape of Table V in a joint movement. The joint involved two good quality concrete blocks (5"×5") coated with vinyl ester (5 mil thick) and then cured. The blocks were fitted on a rig consisting of two steel plates on a platform fitted with a dial indicator (supplied by Fowler Company) to measure movement of the two blocks. The vinyl ester surface was scratched with 40-grit sandpaper. The blocks with the rig was taken in the refrigerator and cooled to 35° F. The adhesive resin and the curing agent were cooled to 40° F., mixed thoroughly and applied to a thickness of 15 mil on the vinyl coated concrete block leaving ½" bare on both side of the joint. The EL-joint tape was cooled to 40° F., and was applied on top of the adhesive, and gently pressed to secure the tape. The rig was returned to the refrigerator at 40° F., and the adhesive was permitted to cure at that temperature for 7 days.

The test: The test rig was taken out of the refrigerator, and slowly the joint was opened using the dial indicator. Initially the joint was opened to a 50-mil gap. No disbanding or dislodging between the adhesive and tape was observed. The gap was further increased to 100 mil in 5 minutes, eventually to a maximum gap of ⅛" in next 2 minutes. There was no failure, both the tape and adhesive composition were secured in position. The rig was returned to the refrigerator. After 24 hours, it was brought outside. The ⅛" gap was closed all on a sudden (shock). This produced inflection in the middle of the tape, but did not dislodge or disbond. The inflection, however, returned to normal in about 30 minutes. While certain preferred embodiments of the invention have been described herein, the invention is not to be construed as being so limited, except to the extent that such limitations are found in the claims.

What is claimed is:

1. A joint structure secured by a chemically inert polyolefin tape having disposed thereon an adhesive composition comprising an admixture of a reactive halosulfonated polyolefin, at least one acrylate monomer, a bis-epoxy resins, and an alkyl phenol and a minor amount of a halogenated ethylene.

2. The joint structure of claim 1 wherein said joint structure comprises at least two substrates substantially prepared from concrete.

3. The joint structure of claim 1 wherein said joint structure comprises at least two polymer coated concrete slabs.

* * * * *